US010498021B1

(12) United States Patent
Schwartz

(10) Patent No.: US 10,498,021 B1
(45) Date of Patent: Dec. 3, 2019

(54) RF EQUIPMENT CONCEALMENT FOUNDATION

(71) Applicant: Chad Schwartz, Annandale, NJ (US)

(72) Inventor: Chad Schwartz, Annandale, NJ (US)

(73) Assignee: CCS Technologies LLC, Annandale, NJ (US)

( * ) Notice: Subject to any disclaimer, the term of this patent is extended or adjusted under 35 U.S.C. 154(b) by 0 days.

(21) Appl. No.: 16/399,167

(22) Filed: Apr. 30, 2019

(51) Int. Cl.
| H04B 1/38 | (2015.01) |
| H01Q 1/12 | (2006.01) |
| H01Q 1/44 | (2006.01) |
| F15B 15/14 | (2006.01) |
| H04B 1/02 | (2006.01) |
| H04B 1/06 | (2006.01) |

(52) U.S. Cl.
CPC .............. *H01Q 1/44* (2013.01); *F15B 15/14* (2013.01); *H01Q 1/1242* (2013.01); *H04B 1/02* (2013.01); *H04B 1/06* (2013.01); *H04B 1/38* (2013.01)

(58) Field of Classification Search
CPC ... H04B 1/06; H04B 1/38; H04B 1/02; H01Q 1/44; H01Q 1/1242; H01Q 9/28; H01Q 13/12; H01Q 13/14; H01Q 19/175; H01Q 21/0056; F15B 15/14
See application file for complete search history.

(56) References Cited

U.S. PATENT DOCUMENTS

| 3,214,156 | A | 10/1965 | Just-Dictlav Klose et al. |
| 4,114,801 | A | 9/1978 | Van Orden |
| 5,995,063 | A | 11/1999 | Somoza et al. |
| 6,177,883 | B1 | 1/2001 | Jennetti et al. |
| 6,873,303 | B2 | 3/2005 | Creighton et al. |
| 7,283,063 | B2 | 10/2007 | Salser, Jr. |
| 7,554,460 | B2 | 6/2009 | Verkleeven et al. |
| 2002/0089428 | A1 | 7/2002 | Walden et al. |
| 2007/0026796 | A1 | 2/2007 | Mizushina et al. |
| 2014/0182811 | A1* | 7/2014 | Hager ............... H01Q 1/02 165/47 |
| 2015/0351337 | A1* | 12/2015 | Sabadin ............ A01G 25/16 700/282 |
| 2016/0365634 | A1* | 12/2016 | Williams ............ H01Q 3/446 |
| 2019/0157127 | A1* | 5/2019 | Nosrati ............. H05K 1/0212 |

FOREIGN PATENT DOCUMENTS

WO  WO 02/25768  *  3/2002  .............. H01Q 1/12

* cited by examiner

*Primary Examiner* — Andrew Wendell
(74) *Attorney, Agent, or Firm* — Thomas J. Germinario

(57) ABSTRACT

An RF antenna structure conceals RF equipment, comprising transmission, receiver and/or transceiver radios, underground in a foundation chamber than supports the antenna mast or pole. The RF equipment is attached to a pneumatic cylinder which, when pressurized, lifts the radios above the foundation grade, where they can be readily accessed for maintenance, repair and/or replacement. In the unpressurized configuration, the pneumatic cylinder conceals the RF equipment underground, where it is secure and not visually obtrusive. An alternative cylindrical lifting means, such as a hydraulic cylinder or a cylindrical electro-mechanical actuator, can be substituted for the pneumatic cylinder.

13 Claims, 6 Drawing Sheets

RF EQUIPMENT CONCEALMENT FOUNDATION

FIELD OF INVENTION

The present invention relates generally to the field of radio frequency (RF) transmission, and more particularly to RF transmission structures in which the RF equipment is concealed.

BACKGROUND OF THE INVENTION

Concealment of RF equipment used in transmission antennas is desirable both for security and aesthetic reasons. Sometimes, such concealment is feasible within the antenna mast or pole itself. But when the antennas are mounted on existing structures, such as light or utility poles, the RF equipment will be visible unless shrouded by above-ground concealment structures, which can be readily breached. While underground concealment of RF equipment is optimal, it can render the equipment difficult to access for maintenance, repair and/or replacement.

SUMMARY OF THE INVENTION

The present invention is an RF antenna structure in which the RF transmission radios are concealed underground in a foundation chamber that supports the antenna mast or pole, but are attached to a pneumatic cylinder which, when pressurized, lifts the radios above the foundation grade, where they can be readily accessed for maintenance, repair and/or replacement.

The foregoing summarizes the general design features of the present invention. In the following sections, specific embodiments of the present invention will be described in some detail. These specific embodiments are intended to demonstrate the feasibility of implementing the present invention in accordance with the general design features discussed above. Therefore, the detailed descriptions of these embodiments are offered for illustrative and exemplary purposes only, and they are not intended to limit the scope either of the foregoing summary description or of the claims which follow.

DETAILED DESCRIPTION OF THE PREFERRED EMBODIMENT

Figure 1A:
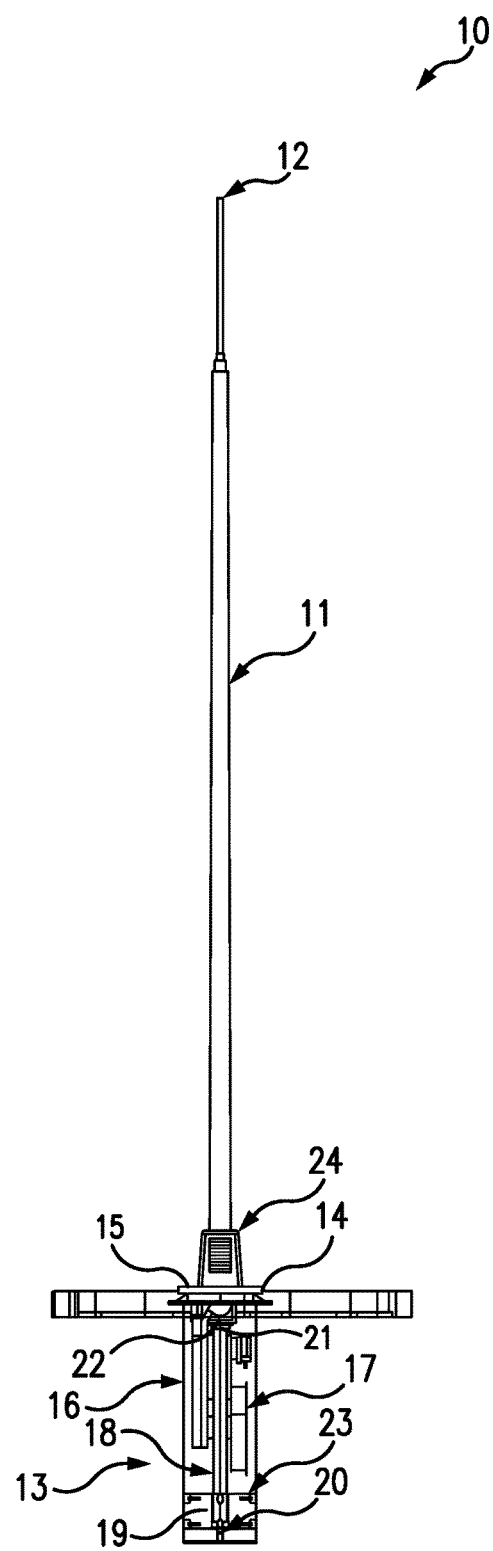
FIG. 1A is a side profile view of the preferred embodiment of the present invention in its unpressurized configuration.

As depicted in FIGS. 1A-3B, the preferred embodiment of the present invention is an RF antenna structure 10 comprising an antenna mast or pole 11, which can be a dedicated pole or a pre-existing light/utility pole, and which supports one or more RF antennas 12. Supporting the mast/pole 11 is a foundation chamber 13, which preferably comprises a buried steel pipe having a lower end cap. At grade, the foundation chamber has a chamber opening 14, over which watertightly fits a liftable chamber covering 15.

The RF antenna structure 10 further comprises a radio equipment assembly 16 comprising one or more RF modules 17, which are transceivers, transmitters, receivers or some combination of same. The RF modules 17 are electrically or wirelessly connected to the RF antennas 12. The RF module 17 are mounted on a pneumatic cylinder 18, comprising a cylinder member 19, a piston rod 20 axially slidable within the cylinder member 19, and a piston 21 at the upper end of the piston rod 20.

Figure 1B:
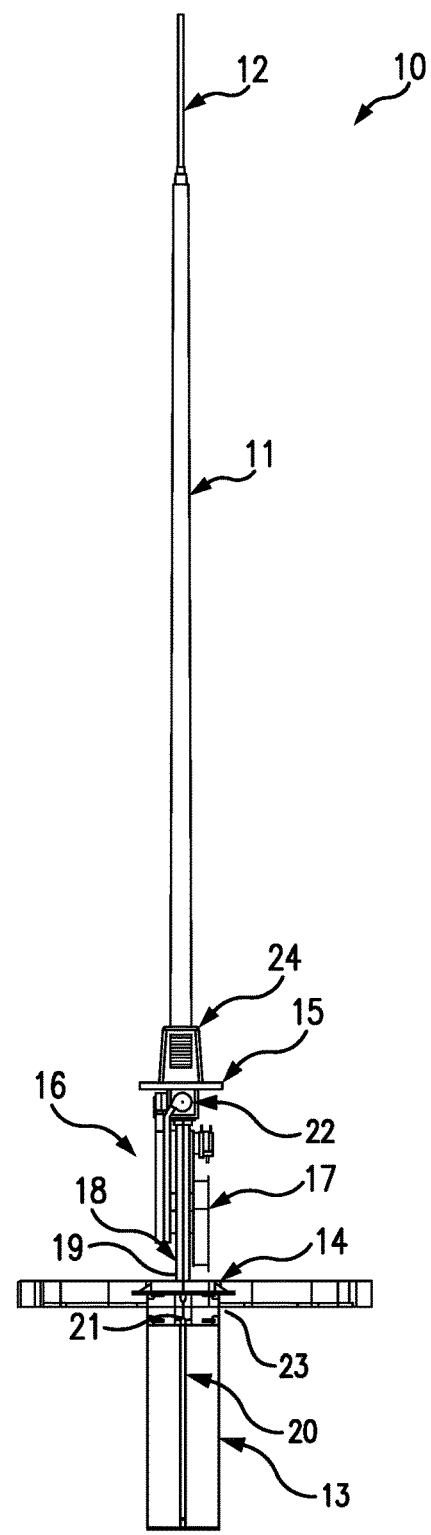
FIG. 1B is a side profile view of the preferred embodiment of the present invention in its pressurized configuration.
Figure 2A:
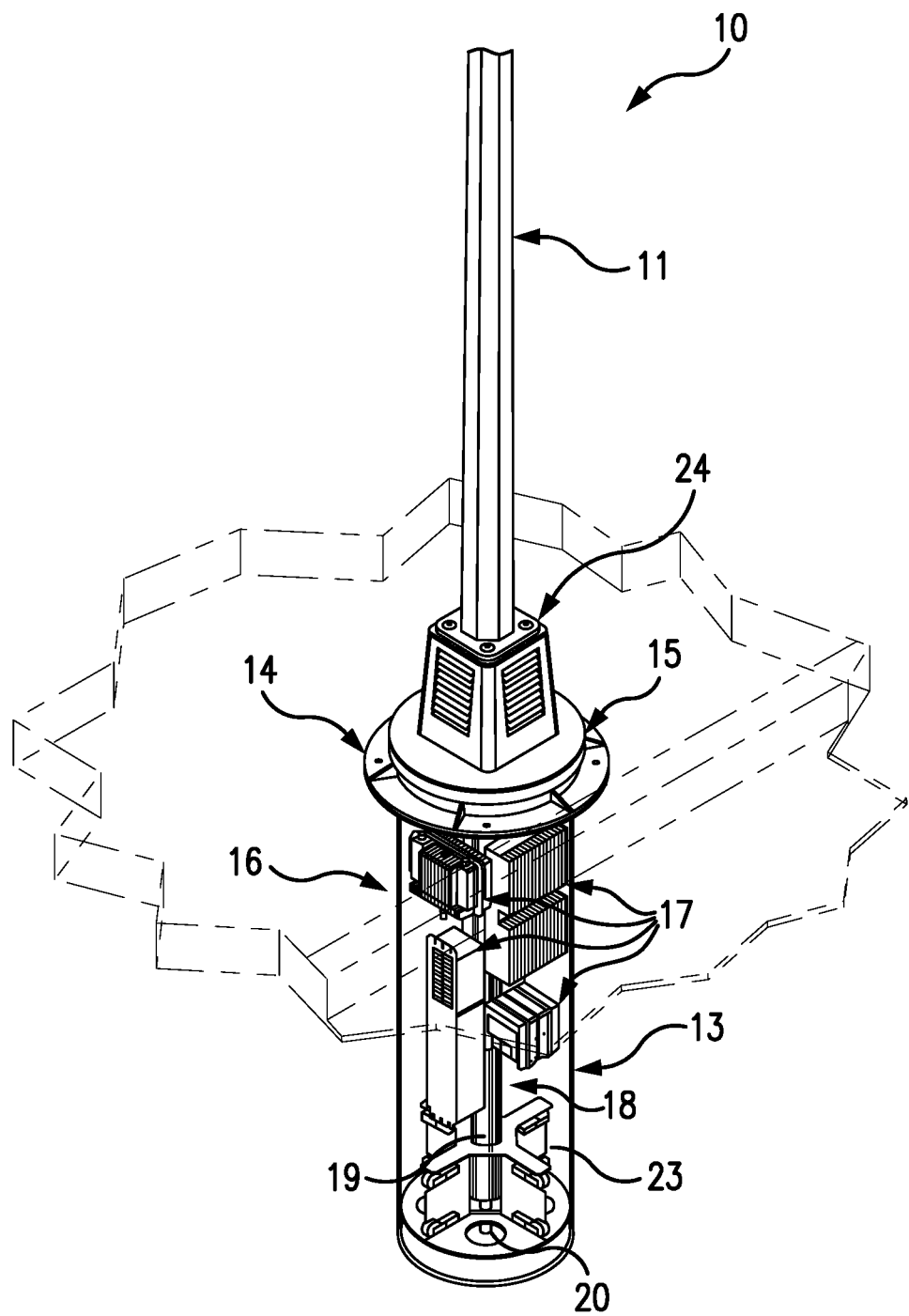
FIG. 2A is a partial cutaway perspective view of the preferred embodiment of the present invention in its unpressurized configuration.
Figure 2B:
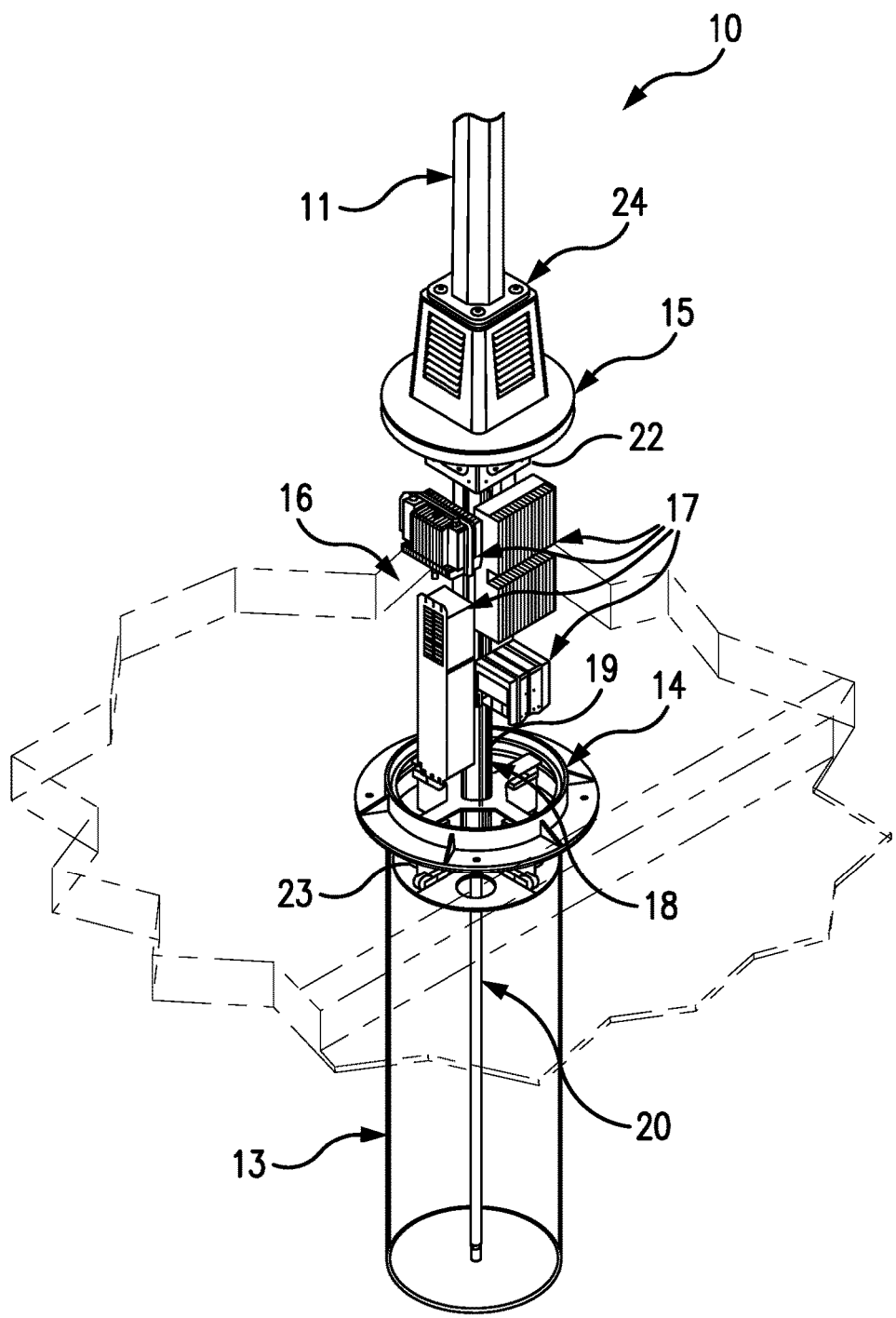
FIG. 2B is a partial cutaway perspective view of the preferred embodiment of the present invention in its pressurized configuration.
Figure 3A:
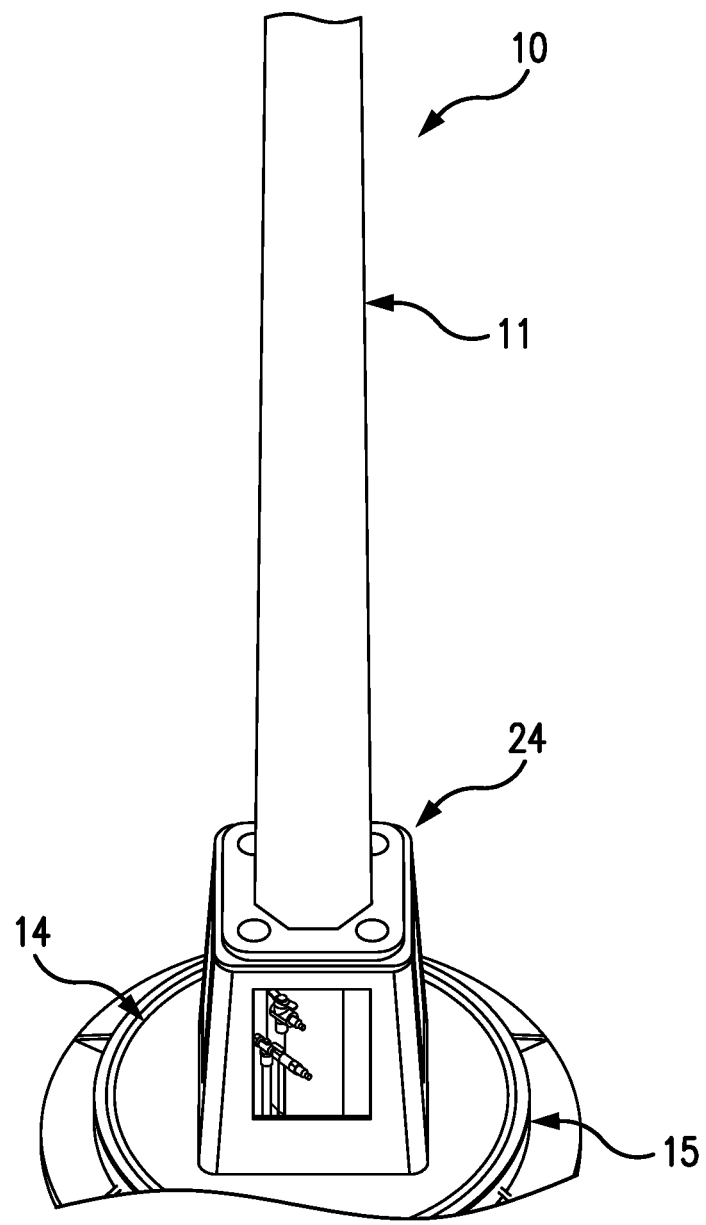
FIG. 3A is a detail perspective view of the mast base according to the preferred embodiment of the present invention.
Figure 3B:
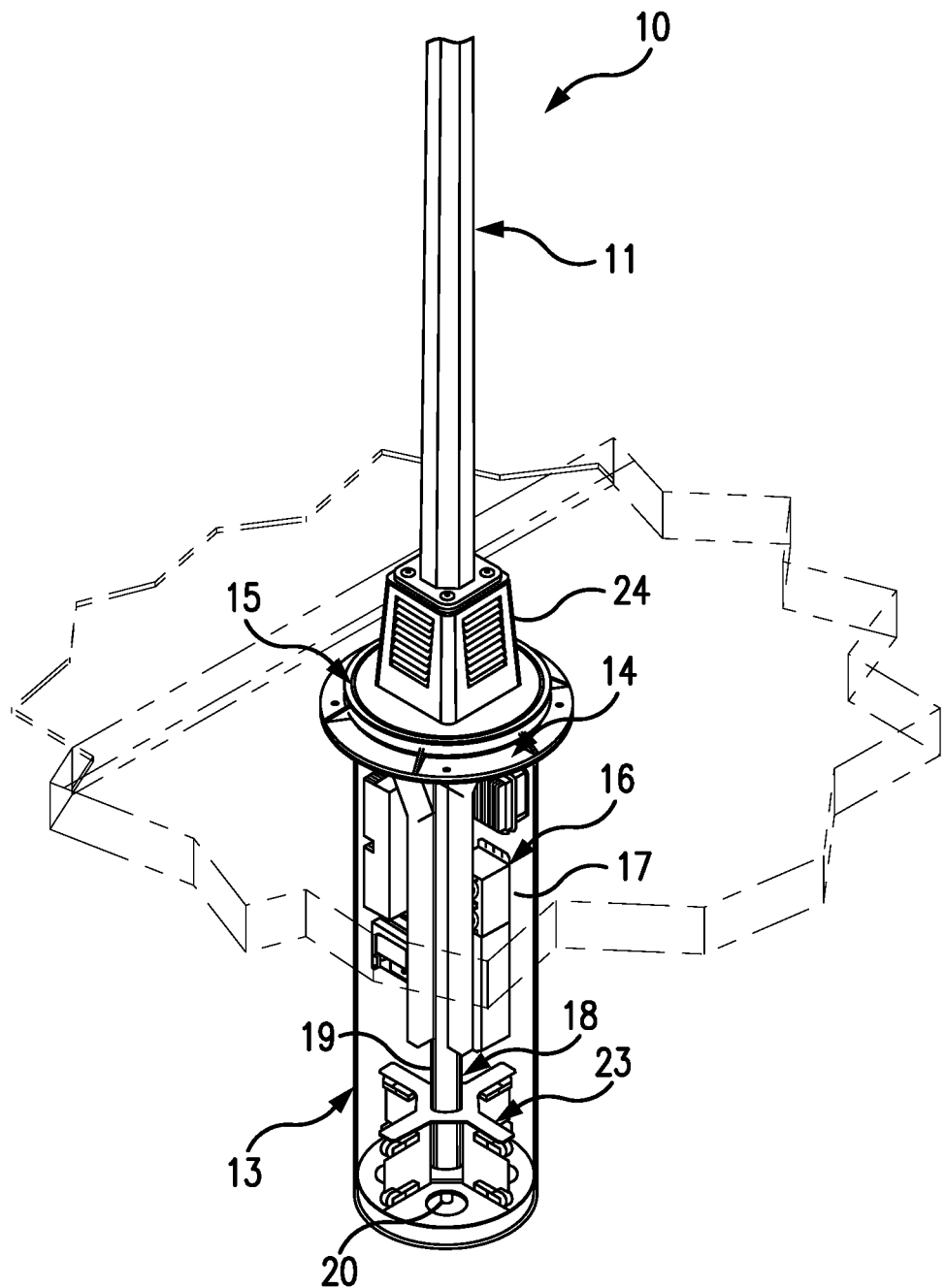
FIG. 3B is a partial cutaway perspective view of the preferred embodiment of the present invention in its unpressurized configuration.

As best seen in FIGS. 1A, 2A and 3B, the pneumatic cylinder 18 can be in an unpressurized state, in which the radio equipment assembly 16 rests below grade within the foundation chamber 13. Alternatively, as best seen in FIGS. 1B and 2B, the pneumatic cylinder 18 can be in a pressurized state, in which pressurized air injected between the piston 21 and the upper enclosure of the cylinder member 19 drives the piston 21 toward the lower end of the cylinder member 19 and lifts the radio equipment assembly 16 so that the RF modules 17 are supported above grade, where they are accessible for maintenance, repair and/or replacement.

As best seen in FIG. 1B, preferably the radio equipment assembly further comprises an air intake apparatus 22, which creates airflow for air cooling for the RF modules 17.

As best seen in FIGS. 2A and 3B, preferably the lower end of the cylinder member 19 is encompassed by a cylinder support carriage 23, which keeps the cylinder member 19 axially aligned with the foundation chamber 13 as it travels along the piston rod 20.

As best seen in FIG. 3A, preferably the antenna mast 11 has a mast base 24, comprising a louvered enclosure containing an air intake/outlet plenum and access to pneumatic controls.

As alternatives to the pneumatic cylinder 18, a hydraulic cylinder, using pressurized liquid instead of gas, or a cylindrical electro-mechanical actuator, such as a screw jack actuator, can be used to lift the radio equipment assembly 16 so that the RF modules 17 are supported above grade.

Although the preferred embodiment of the present invention has been disclosed for illustrative purposes, those skilled in the art will appreciate that many additions, modifications and substitutions are possible, without departing from the scope and spirit of the present invention as defined by the accompanying claims.

What is claimed is:

1. A radio frequency (RF) antenna structure, comprising:
 a substantially vertical antenna mast, which supports one or more RF antennas;
 the one or more RF antennas which are supported by the antenna mast;
 a foundation chamber which supports the antenna mast at a foundation grade;
 a radio equipment assembly;
 wherein the foundation chamber comprises one or more substantially vertical chamber walls surrounding a substantially horizontal chamber floor, and wherein the chamber walls and the chamber floor are located below the foundation grade, and wherein the chamber walls define a chamber opening at the foundation grade;

wherein the foundation chamber further comprises a liftable watertight chamber covering over the chamber opening;

wherein the radio equipment assembly comprises one or more RF modules, which are mounted on a substantially vertical cylindrical lifting means and are electrically or wirelessly connected to the RF antennas, and wherein the cylindrical lifting means comprises a cylinder member and an axial rod within the cylinder member, and wherein the cylinder member has an upper cylinder end terminating in an upper cylinder enclosure which supports the chamber covering, and wherein the cylinder member has a lower cylinder end, and wherein the cylinder member has a cylinder exterior and a cylinder interior, and wherein the RF modules are mounted on the cylinder exterior, and wherein the axial rod has an upper rod end and a lower rod end and is axially slidable within the cylinder interior, and wherein the upper rod end terminates within the cylinder member, and wherein the lower rod end is rigidly affixed to or engages the chamber floor;

wherein the cylindrical lifting means has a lowered configuration, in which the radio equipment assembly rests within the foundation chamber below the foundation grade, and wherein the cylindrical lifting means alternately has a raised configuration, in which the cylindrical lifting means drives the axial rod toward the lower cylinder end and lifts the radio equipment assembly so that the RF modules are supported above the foundation grade and are accessible for maintenance, repair and/or replacement.

2. The RF antenna structure according to claim 1, wherein the cylindrical lifting means comprises a pneumatic cylinder, and wherein the pneumatic cylinder comprises the cylinder member, an axial piston rod, and a piston, and wherein the piston rod has an upper piston rod end and a lower piston rod end and is axially slidable within the cylinder interior, and wherein the upper piston rod end terminates in the piston, and wherein the lower piston rod end is rigidly affixed to or engages the chamber floor, and wherein the pneumatic cylinder has an unpressurized configuration, in which the radio equipment assembly rests within the foundation chamber below the foundation grade, and wherein the pneumatic cylinder alternately has a pressurized configuration, in which a pressurized gas injected between the piston and the upper cylinder enclosure drives the piston toward the lower cylinder end and lifts the radio equipment assembly so that the RF modules are supported above the foundation grade and are accessible for maintenance, repair and/or replacement.

3. The RF antenna structure according to claim 1, wherein the RF modules comprise one or more RF transceivers, RF transmitters, and/or RF receivers, each of which is electrically or wirelessly connected to one or more of the RF antennas.

4. The RF antenna structure according to claim 2, wherein the RF modules comprise one or more RF transceivers, RF transmitters, and/or RF receivers, each of which is electrically or wirelessly connected to one or more of the RF antennas.

5. The RF antenna structure according to claim 3, wherein the radio equipment assembly further comprises an air intake apparatus, which creates airflow for air cooling for the RF modules.

6. The RF antenna structure according to claim 4, wherein the radio equipment assembly further comprises an air intake apparatus, which creates airflow for air cooling for the RF modules.

7. The RF antenna structure according to claim 5, wherein the air intake apparatus is located between the upper cylinder enclosure and the chamber covering, and wherein the upper cylinder enclosure supports both the intake apparatus and the chamber covering.

8. The RF antenna structure according to claim 6, wherein the air intake apparatus is located between the upper cylinder enclosure and the chamber covering, and wherein the upper cylinder enclosure supports both the intake apparatus and the chamber covering.

9. The RF antenna structure according to either one of claim 7 or 8, wherein the lower cylinder end is encompassed by a cylinder support carriage.

10. The RF antenna structure according to any one of claims 1-6, wherein the chamber walls and the chamber floor are formed by a steel pipe with a lower end cap.

11. The RF antenna structure according to claim 9, wherein the chamber walls and the chamber floor are formed by a steel pipe with a lower end cap.

12. The RF antenna structure according to claim 9, wherein the antenna mast has a mast base comprising a louvered enclosure containing an air intake and outlet plenum and at least one pneumatic control access.

13. The RF antenna structure according to claim 11, wherein the antenna mast has a mast base comprising a louvered enclosure containing an air intake and outlet plenum and at least one pneumatic control access.

* * * * *